Aug. 11, 1964  H. T. SPARROW  3,144,309
FLUID PURIFICATION CONTROL SYSTEM
Filed Feb. 12, 1962  3 Sheets-Sheet 1

INVENTOR.
HUBERT T. SPARROW
BY Alfred N. Feldman
ATTORNEY

Aug. 11, 1964  H. T. SPARROW  3,144,309
FLUID PURIFICATION CONTROL SYSTEM
Filed Feb. 12, 1962  3 Sheets-Sheet 3
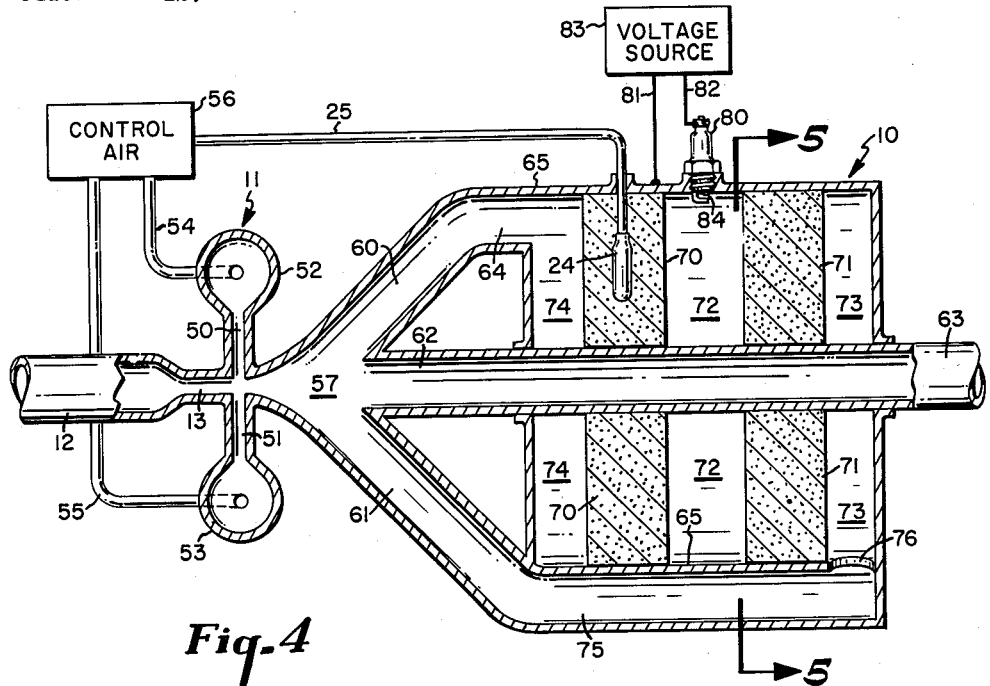
Fig. 4
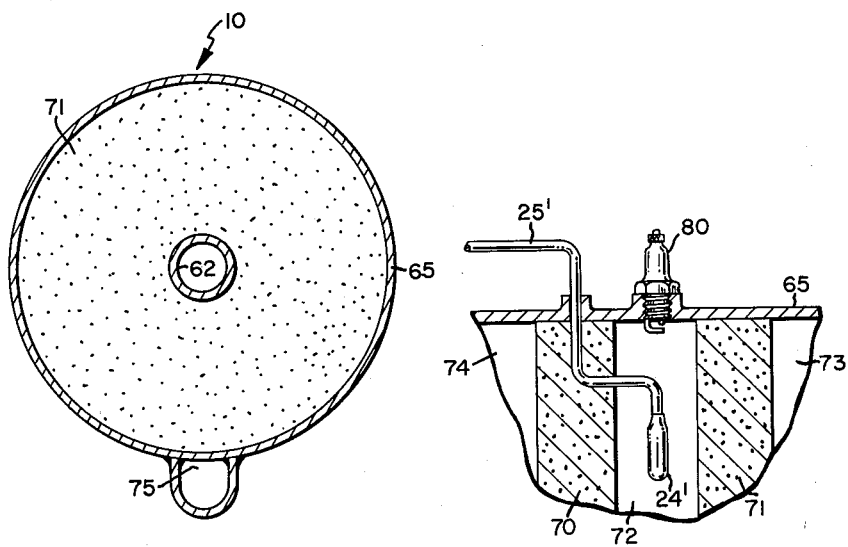
Fig. 5
Fig. 6
INVENTOR.
HUBERT T. SPARROW
BY Alfred N. Feldman
ATTORNEY

United States Patent Office 3,144,309
Patented Aug. 11, 1964

3,144,309
FLUID PURIFICATION CONTROL SYSTEM
Hubert T. Sparrow, Edina, Minn., assignor to Minneapolis-Honeywell Regulator Company, Minneapolis, Minn., a corporation of Delaware
Filed Feb. 12, 1962, Ser. No. 174,348
12 Claims. (Cl. 23—288)

The present application is a continuation in part of application Serial No. 108,803, which was filed on May 9, 1961, and has now been abandoned.

The present invention is directed to the control of a fluid flow through a purification device, and more specifically is directed to the control of gaseous exhaust of the type produced by automobiles through a type of muffler.

The purification of a flowing fluid or gas by passing the fluid over a catalytic element has long been recognized and is now coming into practical application in the prification of automobile exhaust fumes. In an internal combustion engine, petroleum products are ignited with air and a combustion product is expelled from the engine through an exhaust system that normally includes a muffler. The muffler, in the past, has served almost no purpose other than the reduction of the sound that accompanies the operation of this type of engine. In more recent years the noxious qualities of the gas being expelled from automobile exhaust systems has become a problem. In certain areas the problem has become acute and laws have been enacted which will eventually force the utilization of some type of system to purify automobile exhaust fumes prior to venting the exhaust fumes to the atmosphere.

One of the most common approaches to the purification of automobile exhaust fumes is passing the exhaust fumes over a catalytic element or afterburner that reacts with the unburned particles contained in the exhaust and which converts substantially all of these particles to a more suitable or less harmful gas. By a more suitable gas, the applicant means a gas of the type such as carbon dioxide with little or no unburned hydrocarbons contained in the gaseous mixture. The reaction of the catalytic muffler is of very little direct interest in the present application and as such the present invention is directed specifically to a control system for causing the exhaust gas from an internal combustion engine to pass over the catalytic element or to bypass the catalytic element as may be needed for the proper operation of the unit. The present invention is also directed to a control system which is capable of directing an exhaust gas from an internal combustion engine through a heat exchange member or means which is associated with a combustion chamber. The combustion chamber is operated initially by applying a voltage to a spark plug, and subsequently this operation becomes self-sustaining by the exhaust gas being heated by first passing through the heat exchange means.

In the operation of a catalytic muffler, the catalytic element can readily become overheated if an excess amount of certain exhaust fumes pass through the element thereby supplying an excessive amount of unburned impurities. If the catalytic muffler element becomes overheated, the catalytic agent contained in the muffler element deteriorates and the muffler becomes inefficient and useless as a purification media. In order to prevent the overheating of a catalytic muffler element, various control systems have been evolved. The present control system recognizes the problem of the overheating and solves this problem by diverting the exhaust from the internal combustion engine around the catalytic purification element so that the element has a chance to cool. As soon as the element has cooled sufficiently to allow its safe operation, the exhaust from the internal combustion engine is once again diverted through the catalytic element rather than around it to the atmosphere. The present manner in which the exhaust gas is controlled is believed to be unique in that no moving parts are required in the main exhaust stream. The present invention utilizes a small control signal that may or may not involve the use of the corrosive and hot exhaust gases. If the exhaust gases are used, a small quantity is used and this small quantity can be readily controlled to in turn control the large quantity of gas expelled by an internal combustion engine when in operation.

The present invention also can be readily applied to an afterburner type of muffler that utilizes a spark source for initially igniting a combustible mixture of gases which is formed by combining air with the exhaust gas. The combustion occurs in a chamber and is initially started by a spark or other ignition means by conventional methods. As the combustion progresses, the heat is alternately stored in a heat exchange means which is alternately used as a preheating device for the combustion mixture and as a means of then storing a resultant heat so that the afterburner effect becomes self-sustaining. Once again the heat exchange means must be protected from an unsafe operating temperature. It thus becomes apparent that the heat exchange means has a safe, desirable condition, and an unsafe condition depending on the temperature and in order to cool the system it is necessary to divert the internal combustion engine exhaust gas completely around or by the heat exchange means to allow it to cool sufficiently to again regain normal operation. The conditions under which the heat exchange means may overheat are related to the amount of undesirable or objectionable components of unburned hydrocarbons which may exist. These undesirable conditions can occur during certain modes of operation of the internal combustion engine, which are not of great concern in the present invention.

The primary object of the present invention is to disclose a muffler control system that directs the hot exhaust gases of an internal combustion engine either through or around a purification element without exposing the control device to the corrosive and detrimental effects of the main exhaust gas stream itself.

A further object of the present invention is to utilize a fluid amplifier to switch the hot exhaust gases of an internal combustion engine through or around a catalytic muffler element to control the system to prevent overheating of the catalytic element itself.

Yet a further object of the present invention is to disclose a fluid amplifier which periodically switches the hot exhaust gas of an internal combustion engine through a heat exchange means in one type of muffler thereby heating the exhaust gas to cause a self-sustained burning of the undesirable hydrocarbons after an initial starting of the burning process by a spark from a spark plug or other ignition means.

Still a further object of the present invention is to disclose a fluid purification system that utilizes a fluid amplifier for control of the system and in which the excess air needed for proper combustion is introduced as the control means or pressure for the fluid amplifier control means.

A still further object of the present invention is to disclose a fluid amplifier control system for an afterburner type muffler in which the fluid amplifier oscillates or periodically causes the exhaust gas to move in outlet channels to alternately supply a hot gas to a heat exchange means for proper oxidation or burning of the gas.

Yet another object of the present invention is to disclose a fluid purification system that utilizes a fluid amplifier as the control means for switching the flowing fluid through or around the purification element in response to the temperature of the purification element.

Another object of the present invention is to disclose a fluid purification system that has no physical obstructions in the fluid flow circuit other than the purification element and yet is capable of controlling the fluid flow through or around the purification element.

These and other objects will become apparent when the following drawings are considered with the present specification.

FIGURE 4 is a schematic representation of a fluid purification system that utilizes an afterburner type of muffler that has a heat exchange means formed with two heat exchange members that define a combustion chamber;

FIGURE 5 is a cross-section of part of the device disclosed in FIGURE 4 along lines 5—5; and, FIGURE 6 is a modification of the condition sensing means.

Figure 2:
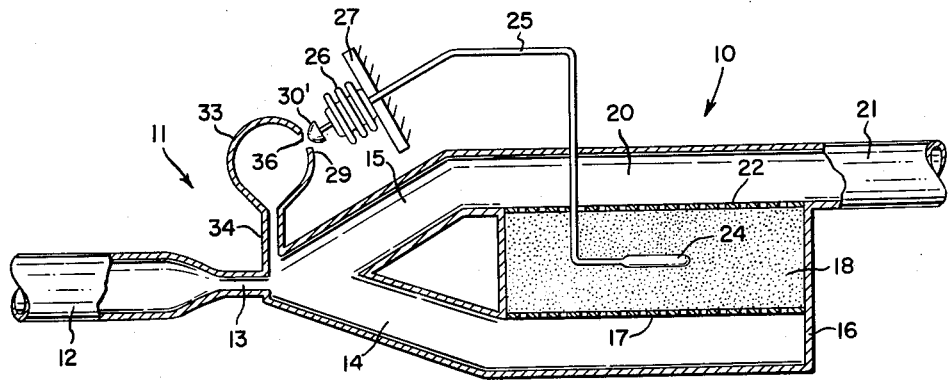
FIGURE 2 is a schematic representation of a fluid purification system that utilizes a fluid switching means that operates on a pressure differential.
Figure 3:
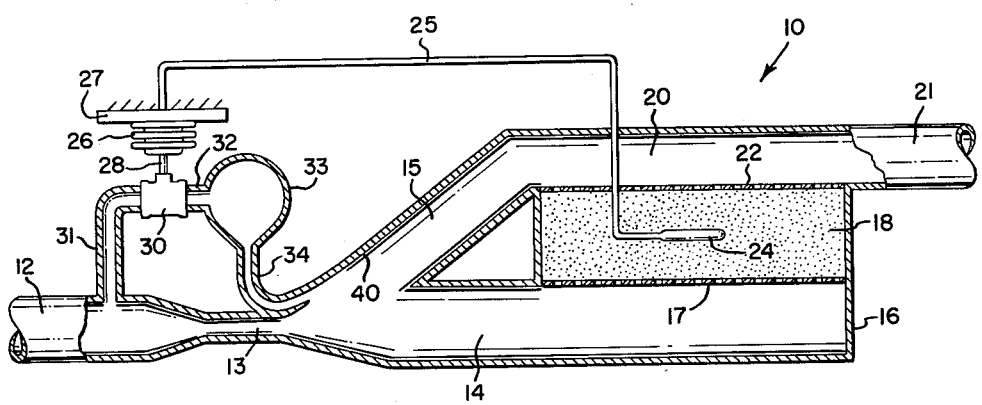
FIGURE 3 is a schematic representation of a fluid purification system wherein an induction type of fluid control device causes the switching of the fluid to be purified.

Broadly the present application is directed to the utilization of fluid amplifiers for switching of the highly corrosive and hot fluids of a fluid flow system that requires purification by the use of a muffler element. The types of fluid amplifiers disclosed are becoming well known in the art and are presently covered by pending patent applications in the United States and foreign countries. The operating principles of fluid amplifiers are extensively discussed in Patent No. 3,001,698 to R. W. Warren, and Patent No. 3,001,539 to H. Hurvitz. An induction type of fluid amplifier which utilizes a viscous attraction of fluids is fully disclosed and explained in an application to Richard J. Reilly, which was filed on November 16, 1960, and assigned Serial No. 69,645, which issued April 24, 1962, as Patent 3,030,979. The schematically represented purification systems of FIGURES 1, 2, and 4 operate with fluid amplifiers of the types disclosed in the Warren and Hurvitz patents, while the fluid amplifier disclosed witth the muffler system of FIGURE 3 is of the type disclosed in the Richard J. Reilly application.

Figure 1:
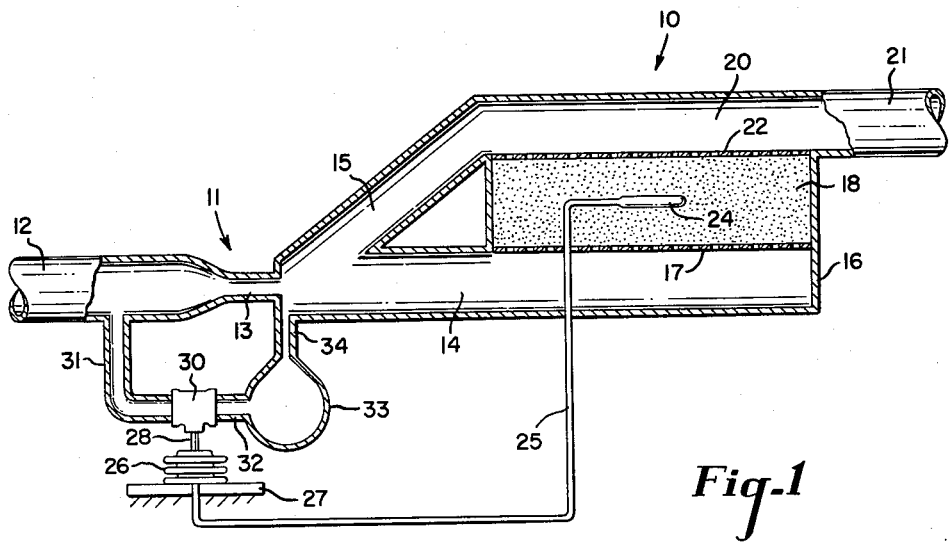
FIGURE 1 is a schematic representation of a catalytic muffler or catalytic purification system utilizing a jet operated fluid amplifier.

In FIGURE 1 there is schematically represented a fluid purification system that will be specifically described as an internal combustion exhaust gas purification system utilizing a catalytic element or element means. The muffler portion or element means is designated as 10 while the control portion or control pressure means is designated as 11. A hot exhaust gas from an internal combustion engine is introduced into inlet pipe 12 where it flows into a nozzle 13. The pipe 12 and nozzle 13 form a fluid inlet means which introduces the hot exhaust gases from the engine. The nozzle 13 further opens into fluid flow outlet means including channels 14 and 15. Due to the construction of the channels 14 and 15, the fluid flowing through nozzle 13 flows almost entirely in the channel 14 which is dead ended at a wall 16.

A perforated wall 17 opens into the side of a first fluid flow means or channel 14 and allows the hot exhaust gases to pass through the wall 17 into a catalytic element 18. The catalytic element 18 is a porous structure having a catalytic material contained therein in a manner well known in the chemical arts. A description of the specific type of catalytic element is believed unwarranted and forms no part of the present invention.

The fluid flow means or channel 15 opens into a pipe-like section 20 that in turn connects to a pipe 21 that extends as the normal exhaust for the internal combustion engine system. The channel 20 has a perforated wall 22 on a side opposite the perforated wall 17 of the catalytic element 18. It is thus apparent that any of the exhaust gases passing into pipe 12 pass through the nozzle 13 and are naturally directed into the channel 14 where they flow through the perforated wall 17 and are purified by the catalytic element 18 before being exhausted to the pipe 21.

Embedded in the catalytic bed 18 is a bulb 24 filled with an expansible fluid and the bulb in turn is connected to a pipe 25. The bulb 24 and pipe 25 form a conventional bulb and fill element for temperature sensing and supply a fluid pressure to a bellows 26 that is mounted on any convenient surface 27. Attached to the bellows 26 is a shaft 28 that operates a valve means 30. The valve means 30 is a normally closed type of valve that is interposed between pipes 31 and 32. Pipe 31 connects to the pipe 12 and allows a small portion of the hot exhaust gases to reach the valve means 30. When the valve means 30 is open the pipe 32 allows the fluid flow into a pressure equalizing chamber 33 that is connected to a control inlet means 34. The control inlet means is a pipe that extends into the wall of the channel 14 at right angles to the nozzle 13 and is capable of supplying a fluid pressure at right angles to the fluid flow path through the nozzle 13.

In the operation of FIGURE 1, the hot gas from the internal combustion engine passes through the pipe 12 and nozzle 13, through the channel 14, and through the catalytic element 18 to the atmosphere by way of pipe 21. If the flow of unburned hydrocarbons in exhaust gas through the catalytic element 18 becomes excessive, the catalytic element heats up and causes the bulb 24 to heat also. The heat in bulb 24 causes the fluid in the bulb 24 to expand into pipe 25, and the fluid in pipe 25 in turn is forced into the bellows 26. The bellows 26 by means of the stem 28 opens the valve means 30 allowing a small amount of the hot exhaust gas to pass through the pipe 31 to pipe 32 and into the equalizing chamber 33. This gas flow then creates a jet through the fluid control inlet means 34 and impinges on the side of the jet passing out of nozzle 13. The momentum of the control jet from the inlet means 34 shifts the fluid flowing through the nozzle 13 into channel 15 and then into the pipe 20 to the outlet pipe 21. The theory of operation of this particular type of amplifier and the pressures involved are set out at great length in the patents previously referenced.

As soon as the temperature of the catalytic element 18 drops to a satisfactory level, the fill in the bulb 24 contracts and in turn closes the valve means 30 thereby cutting off the fluid flow from the control inlet means 34. This reduction in flow allows the fluid entering pipe 12 again to pass directly into channel 14 and through the catalytic element 18 where it is purified and exhausted to the atmosphere in an acceptable form.

In FIGURE 2 there is again shown inlet pipe 12 reduced in cross section to nozzle 13. The nozzle 13 opens into fluid flow outlet means including channels 14 and 15 with the nozzle 13 directed so that the natural flow of fluid is into the channel 14. Channel 14 is again dead ended at 16 with a porous wall 17 and a catalytic element 18. The catalytic element is exposed on its top side by a porous or open wall 22 which enters into pipe 20 and exhaust pipe 21 as detailed in FIGURE 1. Again a bulb 24 is provided with a pipe 25 that passes through support 27 to a bellows 26. A valve means 30' is provided but in this case it is provided in the wall 29 of the pressure equalizing chamber 33. The valve 30' is made up of a valve member and a hole 36 which is open to the atmosphere. The equalizing chamber 33 again is provided with a fluid control inlet means 34 that is directed at the side of the nozzle 13.

The operation of FIGURE 2 again is based on the fluid amplifier teaching of the cited patents and will only be briefly described herein. The fluid flowing into pipe 12 is ejected from the portion or nozzle 13 and flows freely into the channel 14, through the porous wall 17, and through the purifying catalytic element 18. The purified gas then passes into the pipe means 20 through the perforated wall 22 and out of the exhaust pipe 21. While the fluid flows in this manner the fluid inlet means 34 has a direct communication with the atmospheric pressure and therefore the fluid inlet means 34 allows atmospheric pressure to exist on that side of the jet issuing from the nozzle 13. This action sucks air through opening 36 and this air is mixed with the hot exhaust gas from the internal combustion engine. This mixture therein contains sufficient excess oxygen for complete oxidation of the exhaust gas thereby rendering it suitable to be dumped to the atmosphere.

With the physical configuration disclosed this will not affect the natural flow of fluid from the pipe 12 into the channel 14. As the temperature rises and the bulb 24 senses the increase, the bulb fluid forces its way into bellows 26 closing valve means 30′ by sealing off the valve or hole 36. The flow of fluid through the channel 14 tends to draw a vacuum in the pressure equalizing chamber 33. This reduction in pressure on the top side of the jet issuing from 13 causes a pressure differential across the flowing fluid and the flowing fluid switches and moves into the channel 15 thereby passing directly out of the exhaust pipe 21. This again allows the catalytic element 18 to cool and subsequently allows the valve means 30′ to open. As soon as the valve 30′ opens, and the vacuum in chamber 33 is lost, the amplifier switches so that the natural flow again exits through pipe 12 and into channel 14.

Disclosed in FIGURE 3 again is a pipe 12 which is directed to the supply of gas or fluid to be purified. This gas flows through nozzle 13 into channel 14 which is the natural flow path for the fluid. A channel 15 is provided that is a bypass path for the fluid. The fluid or gas passing into channel 14 passes through the perforated wall 17 and into the catalytic element 18. The gas flow is again through the perforated wall 22 into the pipe means 20 and out of the tailpipe 21. A bulb 24 is supplied with pipe 25 that in turn passes through the support 27 to bellows 26 which operates on stem 28. The normally closed valve means 30 is shown between the pipes 31 and 32. Pressure equalizing chamber 33 and fluid inlet means 34 are again provided.

In the device of FIGURE 3, the hot gases pass into the pipe 12 and through the nozzle 13 into the natural flow path of the channel 14 and into the catalytic element 18 to the exhaust pipe 21. This purification path again is controlled by the temperature of bulb 24 which causes an expansion of the enclosed fluid and the expansion of bellows 26 to operate valve means 30, if the temperature of the catalytic element 18 becomes too high. The valve means 30 opens allowing a small fluid flow from the pipe 12 into the chamber 33 where it in turn flows out of the fluid control inlet means 34. It will be noted that the opening of the inlet means 34 is directed along the side of the wall 40 of the channel 15. The fluid flowing through the inlet means 34 flows up along the wall 40 of the channel 15 and induces the fluid flowing through nozzle 13 to follow it into channel 15 thereby switching the fluid flow from the pipe 12 to channel 15 and diverting it around the catalytic element. The switching amplifier disclosed in this embodiment is of the type covered by the Reilly application.

In FIGURES 4, 5, and 6, a different type of purification system is disclosed. The system includes a muffler portion or element means 10 which is directly connected to a control portion or a control pressure means 11. The hot exhaust gases from the internal combustion engine are again introduced into pipe 12 where it flows into a nozzle 13. This forms an inlet means for a fluid amplifier means or the control pressure means 11, and is substantially the same as is shown in FIGURES 1 through 3. A pair of inlet pipes 50 and 51 are placed at opposite sides of the channel or nozzle 13 and each of the pipes 50 and 51 opens into pressure equalizing chambers 52 and 53. The chamber 52 is connected by pipe 54 to a control air means 56 while chamber 53 is connected by pipe 55 to the same control air means 56. The control air means 56 is any source of air which can be controllably introduced to pipes 54 and 55 in an alternating fashion or simultaneously. The control air means 56 further is capable of being regulated or controlled by a condition control means that will be described subsequently.

The channel 13 opens into an outlet means 57 that has three outlet channels or means 60, 61 and 62. The outlet means or channel 62 passes directly through the muffler portion or element means 10 and exhausts at pipe 63 to the tailpipe of an automobile. The outlet means or channel 60 opens at 64 into the end of a cylindrical metal housing 65. The cylindrical metal housing 65 contains a heat exchange means in the form of two spaced heat exchange members 70 and 71 which are separated by a combustion chamber 72. The members 70 and 71 can be made of a porous ceramic. The metal housing 65 further forms a pair of end chambers 73 and 74 at the opposite sides of the heat exchange members 70 and 71. The channel or outlet means 61 connects to a further passage means 75 that is external to the housing 65 and opens at 76 into the chamber 73.

Inserted into one of the heat exchange members 70 is a bulb 24 that is connected to a pipe 25 that in turn supplies a fluid pressure to the control air means 56 depending on the temperature of the element 70. Temperature control can also be accomplished as shown in FIGURE 6. In this figure, the bulb 24′ and pipe 25′ sense the temperature of the gas in chamber 72. The gas temperature or pressure can be used to control the system for safe operation. In some cases, temperature control may not be necessary and the amplifier means or control pressure means 11 is used solely to supply a combustible mixture to the element means 10. In order to initiate operation of the device, as will be described in detail below, a spark plug 80 is connected by conductors 81 and 82 to a voltage source 83. The voltage source is connected between the spark plug 80 and the housing 65. Whenever the voltage source is energized, a spark exists at the gap 84 which ignites any combustible mixture that may be contained in the combustion chamber 72.

The operation of the muffler exhaust system disclosed in FIGURES 4 and 5 is as follows. As exhaust gas from an internal combustion engine passes into the pipe 12 and in turn passes through channel 13 to the outlet means 57 of the fluid amplifier or control pressure means 11, air is introduced from the control air means 56 to pipe 54 and thus to pipe 50. The air entering pipe 50 diverts the mixture of air and exhaust gas in the outlet means 57 into the channel 61 and thence to channel 75. The combustible mixture then passes through hole 76 into the end chamber 73. The mixture passes through the heat exchange member 71 into the combustion chamber 72. At this point of operation the voltage source 83 is energized providing a spark in gap 84. The spark ignites the combustible gas in the chamber 72 and the heated gas passes into the heat exchange member 70 thereby increasing its heat content. The gas passing into the heat exchange member 70 then passes into the end chambers 74 where it in turn passes through opening 64 into the outlet passage 60 where it passes back to the outlet means 57. Since a stream of gas is entering the outlet means 57 from the control pressure means 11, the gaseous flow in the passage means 60 turns and passes through the center passage means 62 to the outlet pipe 63 and then to the atmosphere.

The operation described is then periodically reversed by removing the air from pipe 54 from the control air means 56 and applying it to pipe 55. This in turn supplies air to pipe 51 and causes the gas mixture in the outlet means 57 to be diverted into the passage means 60 where it passes into the end chamber 74. The gas passing into end chamber 74 is again a combustible mixture, and it is heated as it passes into and through the heat exchange member 70. The gas then passes into the combustion chamber 72 where it is ignited by the spark plug 80. The hot purified gas passes into the heat exchange member 71 and then to the end chamber 73 where it passes through hole 76, passage 75, passage 61, into the outlet means 57. Here again, the flow is directed out of the passage 62 to the pipe 63.

The alternate operation of the device is periodically switched by the control air means 56 thereby alternating the direction of hot gas through the heat exchange members 70 and 71. These members increase in temperature until the ignition of the combustible mixture in the combustion chamber 72 is self-sustaining. At this time the voltage source 83 can be disconnected and the spark plug 80 is no longer needed to fire the mixture which oscillates back and forth through the combustion chamber 72. If for some reason, the amount of hydrocarbons entering pipe 12 increases to the point where the combustion chamber temperature rises to an unsafe level, the rise in temperature is felt in the heat exchange members or in the gas. In order to protect the heat exchange members against a possibility of excess temperature rise, the bulb 24 or bulb 24' senses the temperature of the heat exchange members or the gas. If the temperature rises sufficiently, the bulb 24 supplies a fluid pressure in pipe 25 to the control air means 56. At this time both of the pipes 54 and 55 are supplied with control air. The simultaneous supply of air to the pipes 50 and 51 causes the jet of exhaust and air to pass straight into the outlet means 57 and directly into the pipe 62, thereby bypassing the heat exchange means in the form of the heat exchange members 70 and 71. As soon as the bypass fluid has flowed in the outlet 63 for sufficient time for the heat exchange members to cool to a safe level, the oscillating operation of the control air means 56 is again initiated by a change in fluid pressure in pipe 25.

It is obvious that the system disclosed in FIGURE 4 supplies unusual functions not found in any prior art devices. The fluid amplifier input arrangement supplies the necessary excess air to provide a combustible mixture and at the same time provides a simple control to either pass the fluid through the element means that purifies it or bypasses the element means that purifies it, dependent on the condition of safety of this element.

Also in case of engine back-fires, the excess exhaust gases would pass directly out tube 63 and thereby protect the heat exchange elements and the muffler from damage under back-fire conditions. The joint function of adding air and providing the safety feature of either bypassing the purification element or passing through it is accomplished with no moving parts in direct exposure to the corrosive hot exhaust gases of the internal combustion engine.

It will be appreciated by considering the disclosures contained, that a control system for the purification of a fluid media has been provided that has no moving parts in the direct and main fluid flow path. This obviously has a very distinct advantage in that it is quite difficult to produce a valving mechanism that can be placed in a hot gaseous mixture from an internal combustion engine and yet have the device operative over a long period of time without jamming and with minimum damage from back-fires, etc. The present devices either disclose valving of air from the atmosphere or a small portion of the exhaust gas. This makes the valving problem substantially easier and also provides a device that has a very minimum of moving parts to perform the control function desired. It is further obvious that the particularly disclosed temperature or condition responsive means may be replaced by any conventional temperature or condition responsive means that is capable of operating a small valve means of the type disclosed at 30 and 30'. While the applicant has disclosed the present construction in five specific embodiments, the applicant believes that many other possible modifications are possible and will be readily apparent to those skilled in the art. As such, the applicant wishes to be limited in the scope of his invention only by the appended claims.

The embodiments of the invention in which an exclusive property or privilege is claimed are defined as follows:

1. A catalytic muffler purification system for conversion of objectionable components from a flowing fluid including: fluid amplifier means having an inlet connected to a source of flowing fluid which contains objectionable components; said amplifier means having two outlet means; a first said outlet means directed through catalytic muffler element means for purification of said fluid and a second said outlet means bypassing said element means; and temperature responsive means sensing the temperature of said element means; said temperature responsive means switching said fluid to said second outlet means so that said fluid bypasses said element means upon said temperature responsive means sensing an unsafe temperature at said element means.

2. A catalytic muffler exhaust system for the conversion of objectionable components from a flowing exhaust gas including: an exhaust gas supply and an exhaust gas inlet pipe opening into two gas flow channels; a first said flow channel containing a catalytic element for purification of said flowing exhaust gas; said inlet pipe directed into said first flow channel to cause said exhaust gas to naturally flow into said first channel as opposed to flowing in said second flow channel; said two gas flow channels joining to form outlet means exhausted to the atmosphere; said exhaust gas flowing in said outlet means to the atmosphere under normal operating conditions in a purified condition; temperature responsive means sensing the temperature of said catalytic element; a control inlet connected to said gas supply and including a normally closed valve; and said control inlet further connecting adjacent to said gas inlet pipe to introduce a diverting gas jet; said temperature responsive means sensing an unsafe temperature in said catalytic element due to an excess of exhaust gas and opening said valve to cause said diverting gas jet to divert said gas flow to said second flow channel and thereby bypass said catalytic element.

3. A catalytic muffler exhaust system for the conversion of objectionable components from a flowing exhaust gas including: and exhaust gas inlet pipe opening into two gas flow channels; a first said flow channel containing a catalytic element for purification of said flowing exhaust gas; said inlet pipe directed into said first flow channel to cause said exhaust gas to naturally flow into said first channel as opposed to flowing in said second flow channel; said two gas flow channels joining to form outlet means exhausted to the atmosphere; said exhaust gas flowing in said outlet means to the atmosphere under normal operating conditions in a purified condition; temperature responsive means sensing the temperature of said catalytic element; a control inlet connected adjacent said exhaust gas inlet pipe and having a normally open valve connected to the atmosphere; said temperature responsive means sensing an unsafe temperature in said catalytic element due to an excess of exhaust gas and closing said valve; and said closed valve causing a lower pressure in said second flow channel by the aspiration of the flowing gas; said pressure reduction causing said exhaust gas to switch to said second flow channel and bypass said catalytic element.

4. A catalytic muffler exhaust system for the conversion of objectionable components from a flowing exhaust gas including: a exhaust gas supply and an exhaust gas inlet pipe opening into two gas flow channels; a first said flow channel containing a catalytic element for purification of said flowing exhaust gas; said inlet pipe directed into said first flow channel to cause said exhaust gas to naturally flow into said first channel as opposed to flowing in said second flow channel; said two gas flow channels joining to form outlet means exhausted to the atmosphere; said exhaust gas flowing in said outlet means to the atmosphere under normal operating conditions in a purified condition; temperature responsive mean sensing the temperature of said catalytic element; a control inlet connected to said gas supply and including a normally closed valve; and said control inlet further connecting adjacent to said gas inlet pipe to introduce a control gas flow along a wall of said second channel; said temperature responsive means sensing an unsafe temperature in said catalytic element due to an excess of exhaust gas and opening said valve to cause a control gas flow along said wall which in turn induces said exhaust gas flow into said second flow channel and thereby bypasses said catalytic element.

5. A purification system for conversion of objectionable components from a flowing fluid including: fluid amplifier means having an inlet connected to a source of flowing fluid which contains objectionable components; said amplifier means having outlet means; said outlet means including passage means directed through oxygenation element means for purification of said fluid; said element means having a safe and an unsafe condition; said outlet means further including second passage means to bypass said element means; and condition responsive means sensing the condition within said element means; said condition responsive means controlling said amplifier means thereby switching said fluid in said outlet means so that said fluid bypasses said element means upon said condition responsive means sensing said unsafe condition of said element means.

6. A muffler exhaust system for conversion of objectionable components from a flowing exhaust gas including: a fluid amplifier having an inlet connected to an exhaust gas supply and an exhaust gas pipe which supplies an exhaust gas to said fluid amplifier; said fluid amplifier having outlet means; said outlet means including passage means directed through oxygenation element means for purification of said exhaust gas; said element means having a safe and an unsafe condition; said outlet means further including second passage means to bypass said element means; and condition responsive means sensing the condition within said element means; said condition responsive means controlling said amplifier thereby switching said gas in said outlet means so that said gas bypasses said element means upon said condition responsive means sensing said unsafe condition of said element means.

7. A muffler exhaust system for conversion of objectionable components from a flowing exhaust gas including: a fluid amplifier having an inlet connected to an exhaust gas supply and an exhaust gas pipe which supplies an exhaust gas to said fluid amplifier; said fluid amplifier having outlet means and further including control pressure means adjacent to said amplifier gas inlet to introduce a control gas to periodically shift said first gas in said outlet means; said first and said control gases combining in said outlet means to form a combustible gas; and said outlet means including passage means directed through oxygenation element means for purification of said combustible gas by said combustible gas being oxidized; said periodic shifting of said combustible gas in said outlet means causing said element means to create a self-sustained purification of said combustible gas.

8. A purification system for conversion of objectionable components from a flowing fluid including: fluid amplifier means having an inlet connected to a source of flowing fluid which contains objectionable components; said amplifier means having outlet means and further including control pressure means adjacent to said fluid inlet to introduce a control fluid to shift said first fluid in said outlet means; said first and said control fluids combining in said outlet means to form a combustible fluid; said outlet means including passage means directed through oxygenation element means for purification of said combustible fluid by said combustible fluid being oxidized; said element means having a safe and an unsafe condition; said outlet means further including second passage means to bypass said element means; and condition responsive means sensing the condition of said element means; said condition responsive means operating said control pressure means thereby shifting said fluids in said outlet means to bypass said element means upon said condition responsive means sensing said unsafe condition of said element means.

9. A muffler exhaust system for conversion of objectionable components from a flowing exhaust gas including: a fluid amplifier having an inlet connected to an exhaust gas supply and an exhaust gas pipe which supplies an exhaust gas to said fluid amplifier; said fluid amplifier having outlet means and further including control pressure means adjacent to said amplifier gas inlet to introduce a control gas to shift said first gas in said outlet means; said first and said control gases combining in said outlet means to form a combustible gas; said outlet means including passage means directed through oxygenation element means for purification of said combustible gas by said combustible gas being oxidized; said element means having a safe and an unsafe condition; said outlet means further including second passage means to bypass said element means; and condition responsive means sensing the condition of said element means; said condition responsive means operating said control pressure means thereby shifting said gases in said outlet means to bypass said element means upon said condition responsive means sensing said unsafe condition of said element means.

10. A purification system for conversion of objectionable components from a flowing fluid including: fluid amplifier means having an inlet connected to a source of flowing fluid which contains objectionable components; said amplifier means having outlet means and further including control pressure means adjacent to said fluid inlet to introduce a control fluid to shift said first fluid in said outlet means; said first and said control fluids combining in said outlet means to form a combustible fluid; said outlet means including passage means directed through oxygenation element means for purification of said combustible fluid by said combustible fluid being oxidized; said element means including two heat exchange members separated by a combustion chamber with said passage means connected to opposite sides of said heat exchange members; said heat exchange members having a safe and an unsafe condition; said outlet means further including second passage means which bypasses said heat exchange members; and condition responsive means sensing the condition of at least one of said heat exchange members; said condition responsive means operating said control pressure means thereby shifting said fluids in said outlet means to said second passage means to bypass both heat exchange members upon said condition responsive means sensing said unsafe condition of said heat exchange members.

11. A muffler exhaust system for conversion of objectionable components from a flowing exhaust gas including; a fluid amplifier having an inlet connected to a source of flowing exhaust gas which contains objectionable components; said fluid amplifier having outlet means and further including control pressure means adjacent to said exhaust gas inlet to introduce a control gas to shift said exhaust gas in said outlet means; said exhaust gas and said control gas combining in said outlet means to form a combustible gas; said outlet means including passage means directed through oxygenation element means for purification of said combustible gas by said combustible gas being oxidized; said element means including two heat exchange members separated by a combustion chamber with said passage means connected to opposite sides of said heat exchange members; said heat exchange members having a safe and an unsafe condition; said outlet means further including second passage means which bypasses said heat exchange members; and condition responsive means sensing the condition of at least one of said heat exchange members; said condition responsive means operating said control pressure means thereby shifting said gases in said outlet means to said second passage means to bypass both heat exchange members upon said condition responsive means sensing said unsafe condition of said heat exchange members.

12. A muffler exhaust system for conversion of objectionable components from a flowing exhaust gas including: a fluid amplifier having an inlet connected to a source of flowing exhaust gas which contains objectionable components; said fluid amplifier having outlet means and further including control pressure means adjacent to said exhaust gas inlet to introduce a control gas to shift said exhaust gas in said outlet means; said control pressure means periodically shifting said exhaust gas in said outlet means under normal operating conditions; said exhaust gas and said control gas combining in said outlet means to form a combustible gas; said outlet means including passage means directed through oxygenation element means for purification of said combustible gas by said combustible gas being oxidized; said element means including two heat exchange members separated by a combustion chamber with said passage means connected to opposite sides of said heat exchange members; said periodic shifting of said exhaust gas in said outlet means alternately causing said combustible gas to flow to alternate sides of said element means thereby periodically reversing flow through said heat exchange members; said heat exchange members having a safe and an unsafe condition; said outlet means further including second passage means which bypasses said heat exchange members; and condition responsive means sensing the condition of at least one of said heat exchange members; said condition responsive means operating said control pressure means thereby shifting said gases in said outlet means to said second passage means to bypass both heat exchange members upon said condition responsive means sensing said unsafe condition of said heat exchange members.

References Cited in the file of this patent

UNITED STATES PATENTS

| | | |
|---|---|---|
| 2,213,121 | Davy | Aug. 27, 1940 |
| 2,898,202 | Houdry et al. | Aug. 4, 1959 |
| 2,991,160 | Claussen | July 4, 1961 |
| 3,001,539 | Hurvitz | Sept. 26, 1961 |
| 3,001,698 | Warren | Sept. 26, 1961 |
| 3,030,979 | Reilly | Apr. 24, 1962 |
| 3,097,074 | Johnson | July 9, 1963 |

OTHER REFERENCES

Pursglove: Science and Mechanics, vol. 31, No. 3, pp. 81–84 (June 1960).

Popular Science Monthly, pages 23–24 (July 1960).